Figure 1:
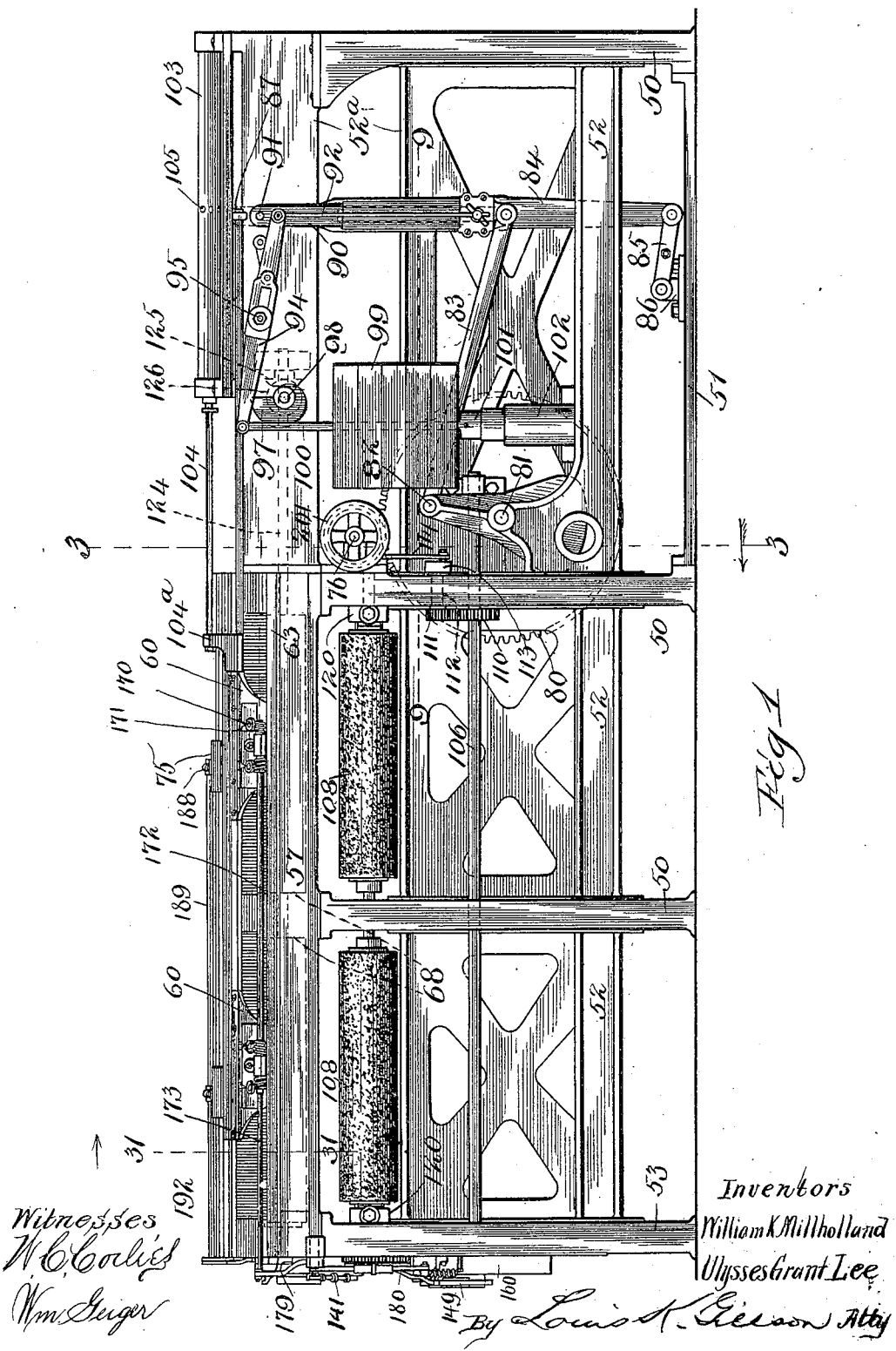

No. 670,159. Patented Mar. 19, 1901.
W. K. MILLHOLLAND & U. G. LEE.
KNITTING MACHINE.
(Application filed Jan. 3, 1900.)
(No Model.) 10 Sheets—Sheet 1.

Witnesses
W. C. Carlisle
Wm. Geiger

Inventors
William K. Millholland
Ulysses Grant Lee
By Louis K. Gibson Atty

No. 670,159. Patented Mar. 19, 1901.
W. K. MILLHOLLAND & U. G. LEE.
KNITTING MACHINE.
(Application filed Jan. 3, 1900.)
(No Model.) 10 Sheets—Sheet 2.
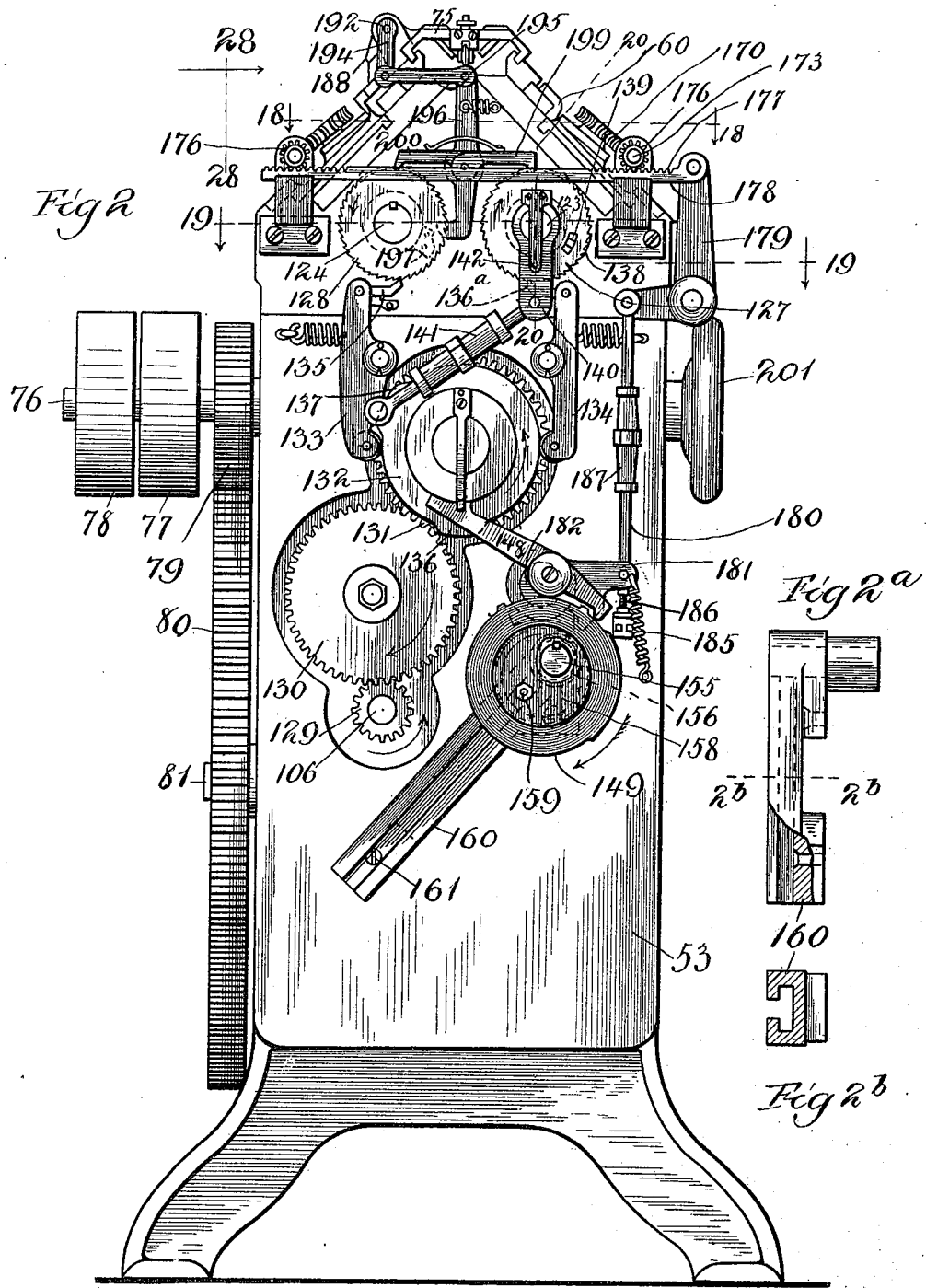
Witnesses
W C Coolies
Wm. Geiger
Inventors
William K. Millholland
Ulysses Grant Lee
By Louis K. Gibson Atty
THE NORRIS PETERS CO., PHOTO-LITHO., WASHINGTON, D. C.

No. 670,159. Patented Mar. 19, 1901.
W. K. MILLHOLLAND & U. G. LEE.
KNITTING MACHINE.
(Application filed Jan. 3, 1900.)
(No Model.) 10 Sheets—Sheet 3.
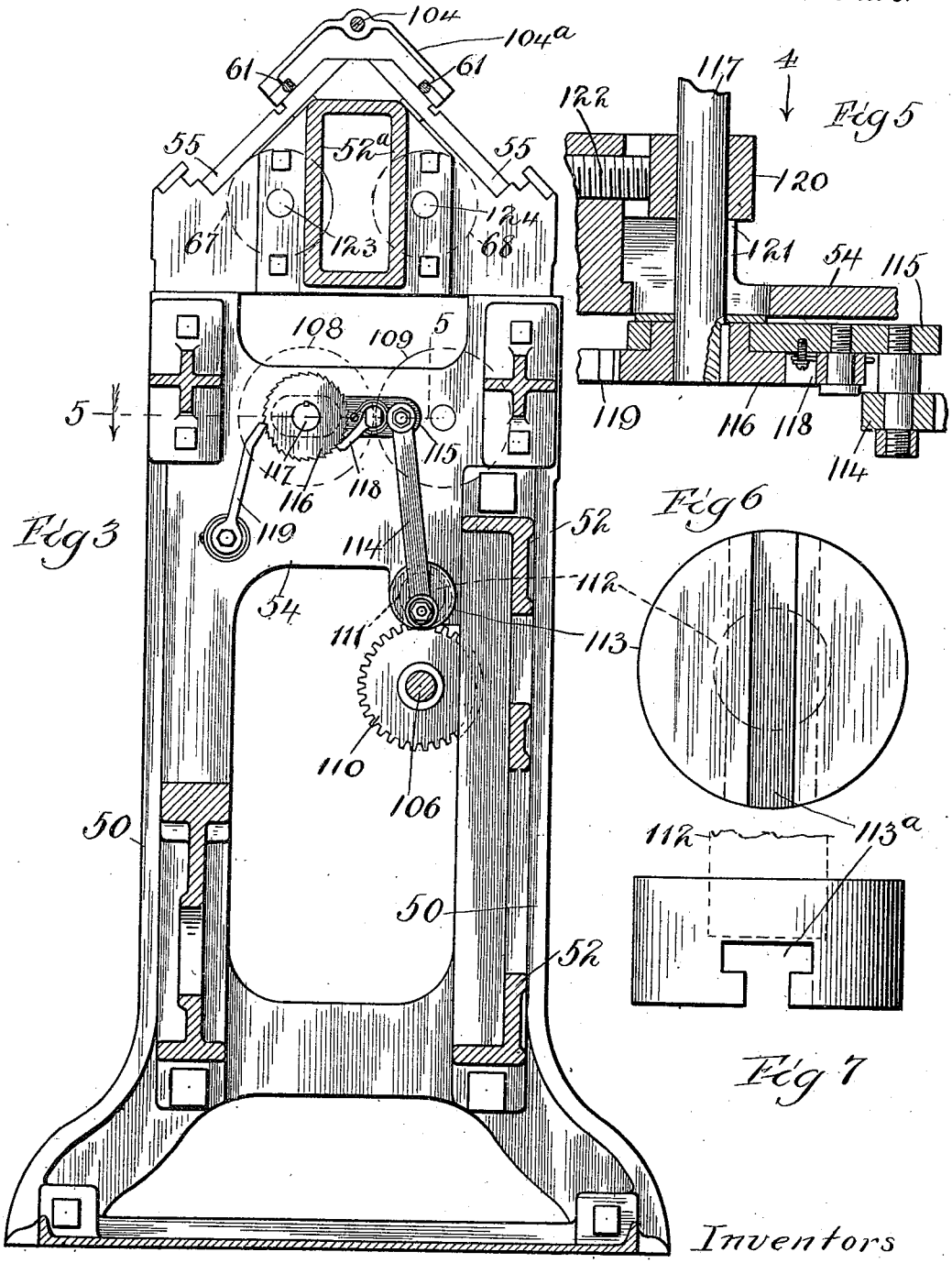
Witnesses
W. C. Corlies
Wm. Geiger
Inventors
William K. Millholland
Ulysses Grant Lee
By Louis K. Gillson
Atty No. 670,159. Patented Mar. 19, 1901.
W. K. MILLHOLLAND & U. G. LEE.
KNITTING MACHINE.
(Application filed Jan. 3, 1900.)
(No Model.) 10 Sheets—Sheet 4.
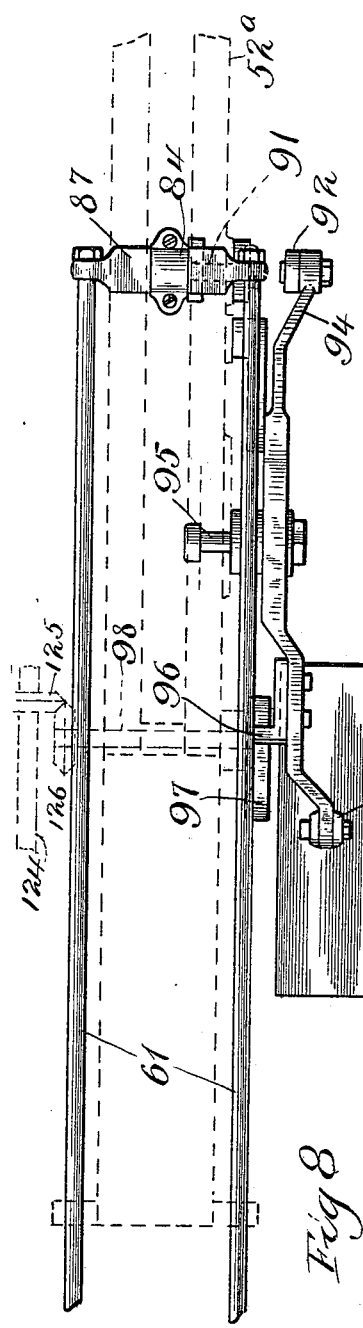
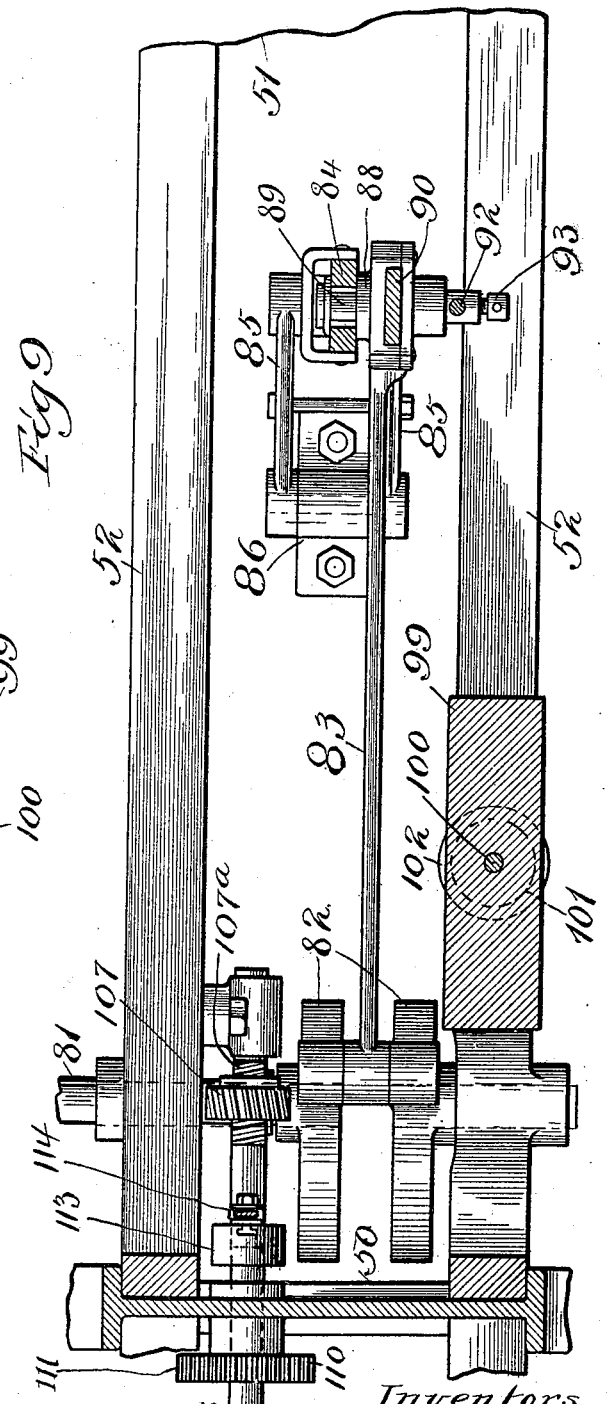
Witnesses
W. C. Corlies
Wm. Geiger
Inventors
William K Millholland
Ulysses Grant Lee
By Louis K Gleason
Atty No. 670,159. Patented Mar. 19, 1901.
W. K. MILLHOLLAND & U. G. LEE.
KNITTING MACHINE.
(Application filed Jan. 3, 1900.)
(No Model.) 10 Sheets—Sheet 5.
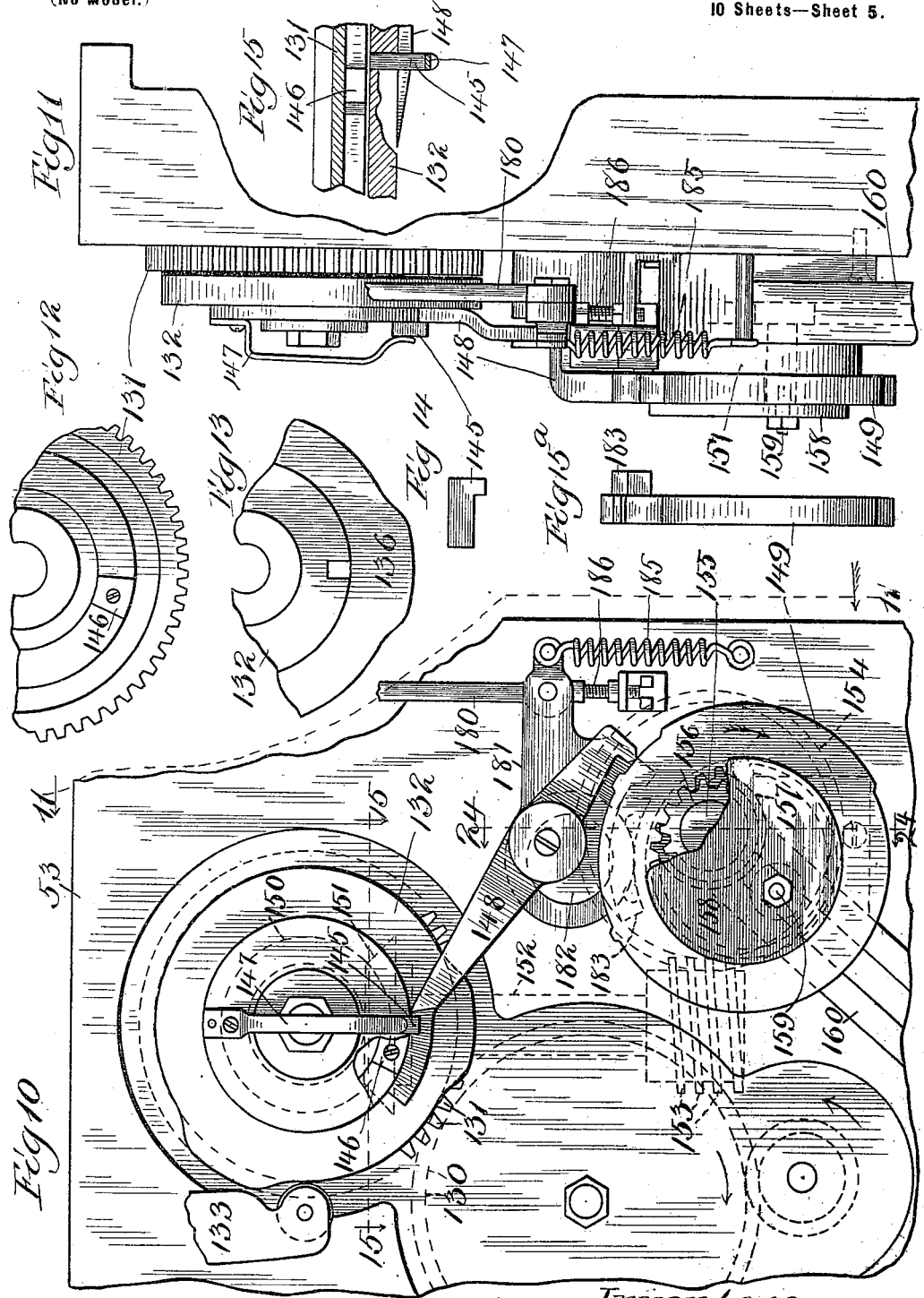
Witnesses
W. C. Coolies
Wm. Geiger
Inventors
William K Millholland
Ulysses Grant Lee
By Louis K Gieson Atty No. 670,159.    Patented Mar. 19, 1901.
W. K. MILLHOLLAND & U. G. LEE.
KNITTING MACHINE.
(Application filed Jan. 3, 1900.)
(No Model.)    10 Sheets—Sheet 6.
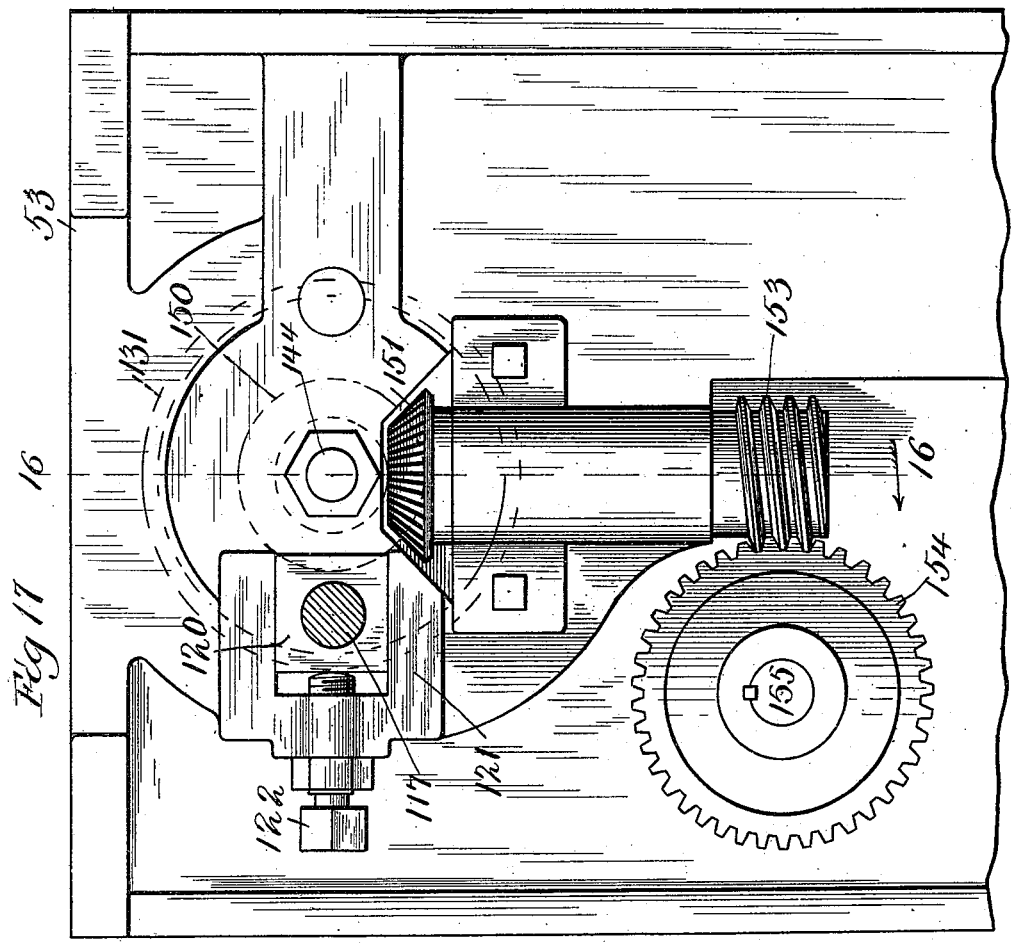
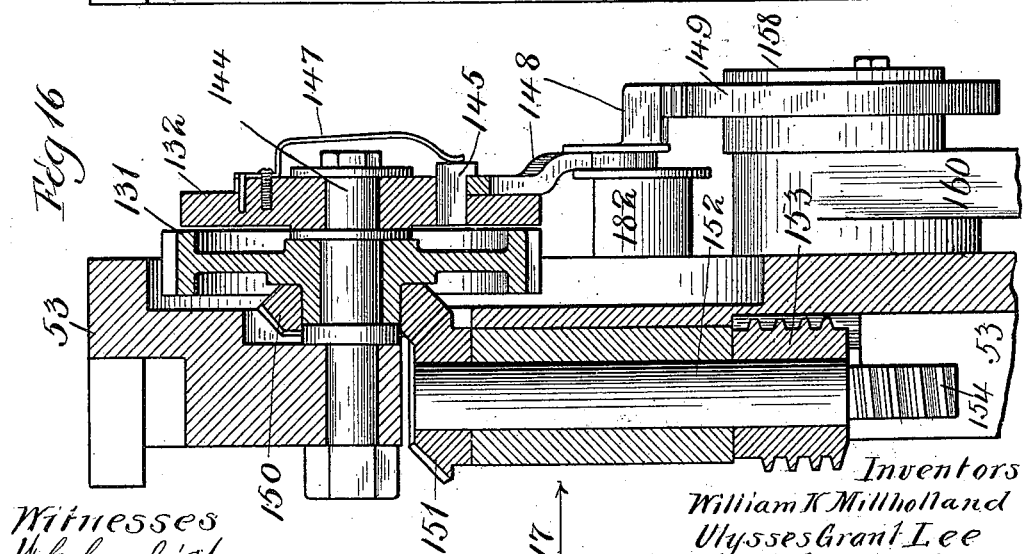
Witnesses
W. C. Coche
Wm. Geiger
Inventors
William K. Millholland
Ulysses Grant Lee
By Louis K. Gilson Atty

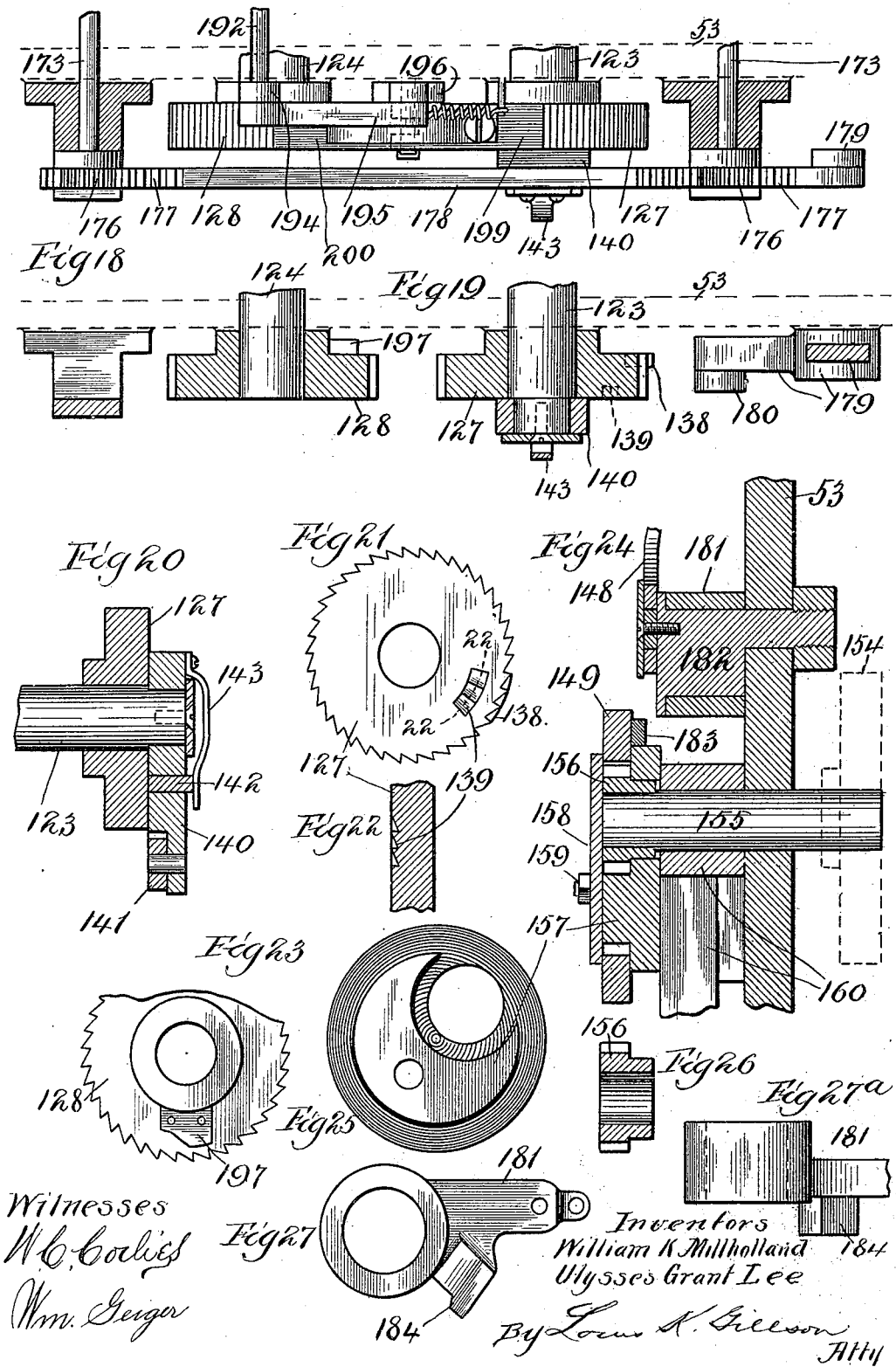

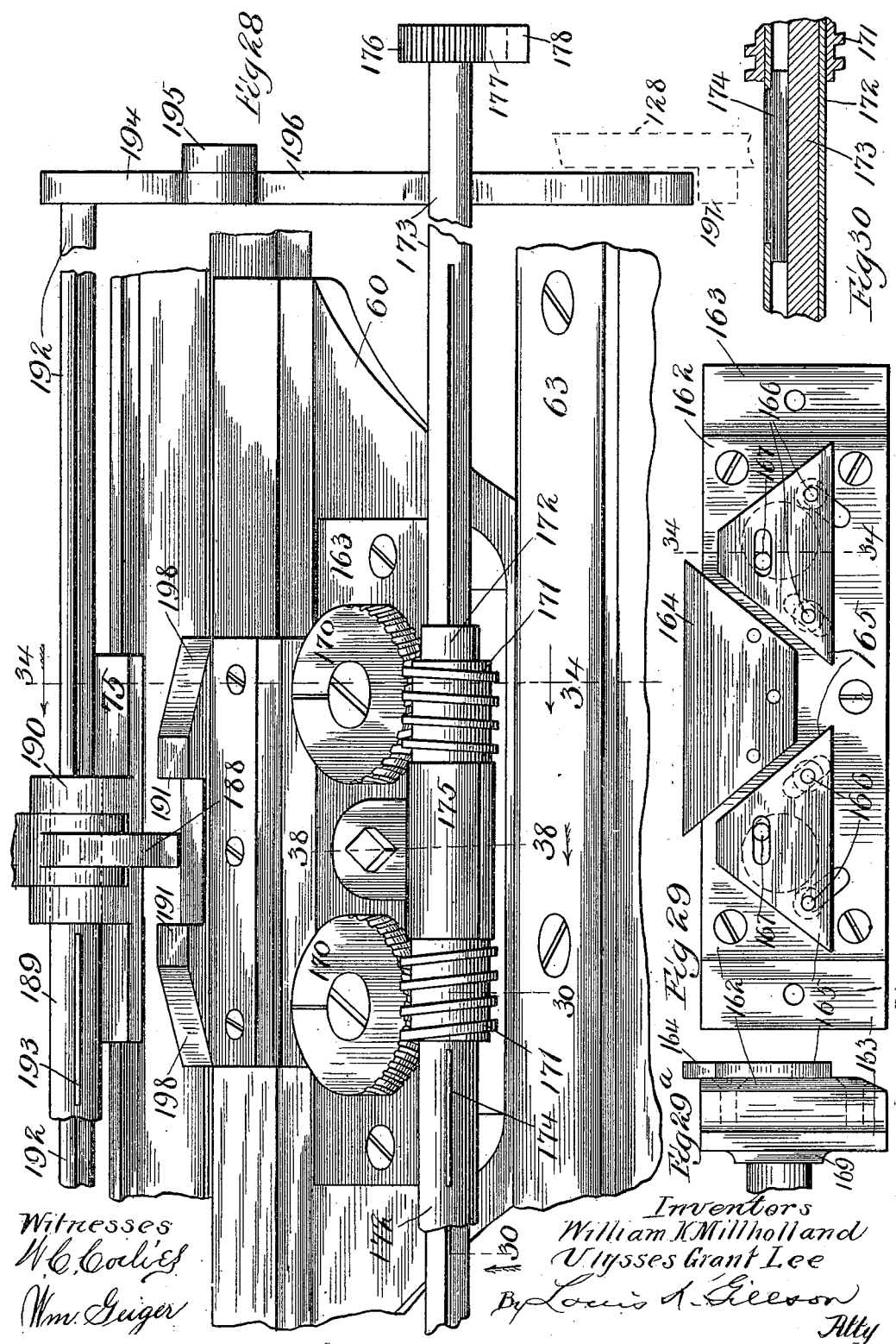

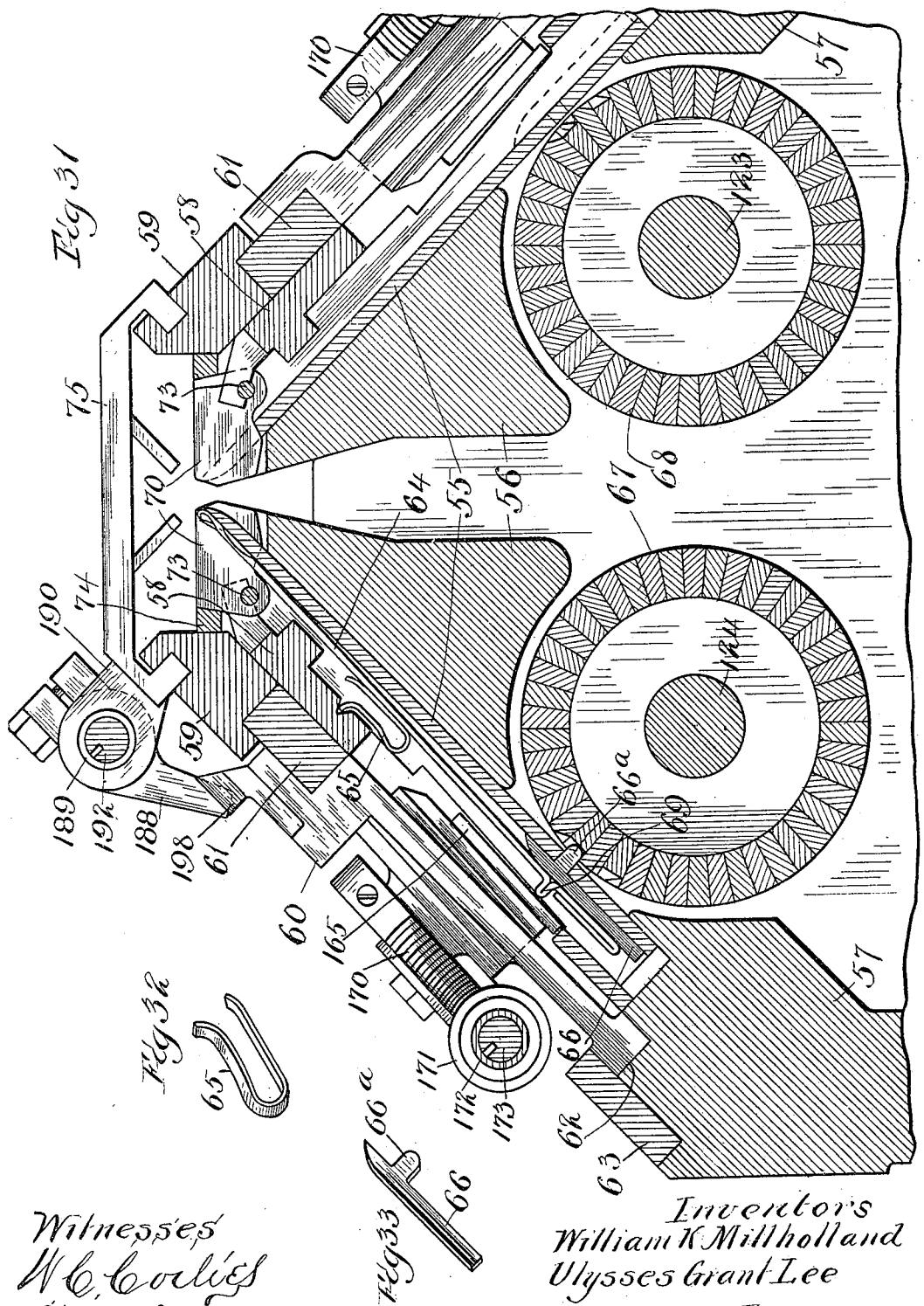

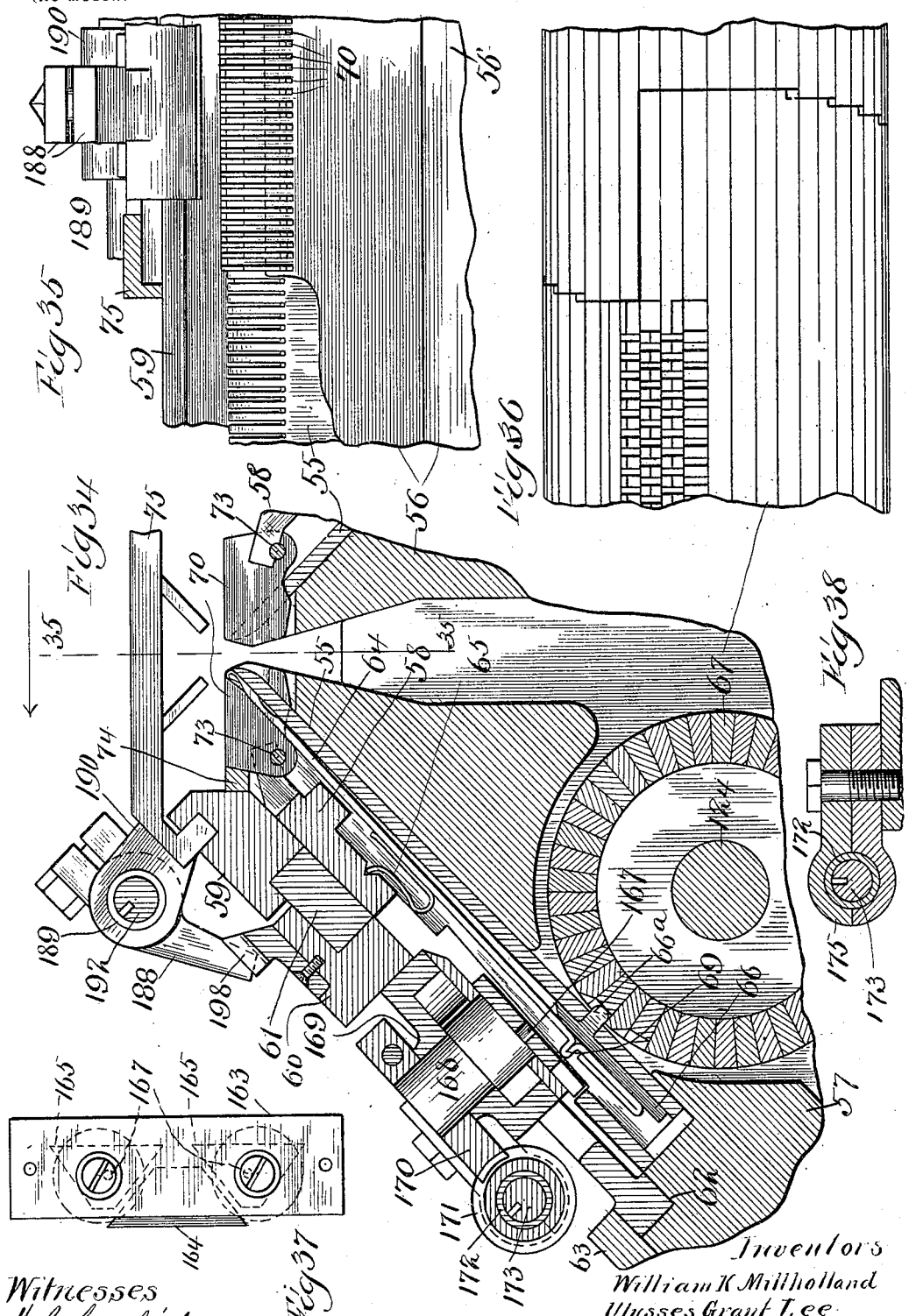

United States Patent Office.

WILLIAM K. MILLHOLLAND AND ULYSSES G. LEE, OF CHICAGO, ILLINOIS, ASSIGNORS TO THE GEORGE D. WHITCOMB COMPANY, OF SAME PLACE.

KNITTING-MACHINE.

SPECIFICATION forming part of Letters Patent No. 670,159, dated March 19, 1901.

Application filed January 3, 1900. Serial No. 233. (No model.)

*To all whom it may concern:*

Be it known that we, WILLIAM K. MILLHOLLAND and ULYSSES GRANT LEE, citizens of the United States, and residents of Chicago, Cook county, Illinois, have invented certain new and useful Improvements in Knitting-Machines, of which the following is a specification and which are illustrated in the accompanying drawings, forming a part thereof.

The invention relates to straight-knitting machines in which a pair of needle-plates is mounted longitudinally upon a suitable frame and each having a transverse pitch of forty-five degrees, the two plates being spaced apart at their upper edges, so as to form the throat of the machine at which the knitting operation is performed and through which the fabric descends, the needles, of the hook-and-latch type, being seated within transverse grooves in the needle-plates and being adapted to reciprocate across the throat of the machine, suitable mechanism being provided for controlling and actuating the needles and for feeding the yarn thereto.

The objects of the invention are to generally improve machines of this type, and more particularly to improve the mechanism for accomplishing the fashioning of garments knitted thereon. The manner of securing these objects is hereinafter fully pointed out, and the details of construction are fully illustrated in the accompanying drawings, in which—

Figure 1 is a side elevation of the machine. Fig. 2 is an end view of the same. Fig. $2^a$ is a side view, partly broken away, of one of the pieces secured to such end. Fig. $2^b$ is a cross-section of the same piece on the line $2^b\ 2^b$ of Fig. $2^a$. Fig. 3 is a transverse section of the machine on the line 3 3 of Fig. 1. Figs. 4, 5, 6, and 7 are details of certain parts of the machine, Fig. 4 being viewed from the position of the arrow 4 on Fig. 5, and Fig. 5 being a section on the line 5 5 of Fig. 3. Fig. 8 is a plan view of a portion of the driving mechanism of the machine. Fig. 9 is a plan section on the line 9 9 of Fig. 1. Fig. 10 is a detail, on an enlarged scale, of a portion of the end of the machine shown in Fig. 2. Fig. 11 is a side view of the same, partly in section, taken on the line 11 11 of Fig. 10. Figs. 12, 13, 14, 15, and $15^a$ are details of parts shown in Figs. 10 and 11, Fig. 15 being a sectional view on the line 15 15 of Fig. 10. Fig. 16 is a sectional view on the line 16 16 of Fig. 17. Fig. 17 is a detail elevation, partly in section, of the inner face of the end of the machine shown in Fig. 2 and viewed from the position of the arrow 17 shown in connection with Fig. 16. Fig. 18 is a detail plan on the line 18 18 of Fig. 2. Fig. 19 is a detail plan section on the line 19 19 of Fig. 2. Fig. 20 is a detail section on the line 20 20 of Fig. 2. Fig. 21 is a detail elevation of one of the parts shown in Fig. 20. Fig. 22 is a detail section on the line 22 22 of Fig. 21. Fig. 23 is a detail elevation of the inner face of one of the ratchet-wheels used on the machine. Fig. 24 is a sectional view on the line 24 24 of Fig. 10. Fig. 25 is an elevation of one of the parts shown in Fig. 24. Fig. 26 is a cross-section of a gear-wheel shown in Fig. 24. Figs. 27 and $27^a$ are a side elevation and plan view, respectively, of one of the parts appearing in Fig. 24. Fig. 28 is a detail elevation of the superstructure of the machine viewed from the line 28 28 of Fig. 2. Fig. 29 is an inverted plan of the cam-plate and cams carried thereby. Fig. $29^a$ is a detail end view of the part shown in Fig. 29. Fig. 30 is a detail section on the line 30 30 of Fig. 28. Fig. 31 is a detail section on the line 31 31 of Fig. 1. Figs. 32 and 33 are details of parts appearing in Fig. 31. Fig. 34 is a sectional detail on the line 34 34 of Fig. 28. Fig. 35 is a detail plan, partly in elevation, partly in section, and partly broken away, taken on the line 35 35 of Fig. 34. Fig. 36 is a detail plan of one of the pattern-cylinders used on the machine. Fig. 37 is a plan view of the cam-plate. Fig. 38 is a detail section on the line 38 38 of Fig. 28.

We have shown in the drawings what is known as a "two-bed" machine capable of fabricating two garments simultaneously and having a frame comprising a series of uprights 50, joined by longitudinal rails 52 and $52^a$ and provided with a floor-plate 51 and having an end plate 53 and a transverse partition 54 intermediate of its ends. A pair of needle-plates 55 55 is carried by the parts 53 and 54, the two plates being mounted upon opposite sides of the machine and inclined toward each other at an angle from the horizontal of about forty-five degrees, their upper edges being spaced apart to form the throat of the machine. These needle-plates are supported by longitudinal rails 56, adjacent to their upper edges, and longitudinal rails 57 at their lower edges. Superimposed upon each of the needle-plates adjacent to its upper edge is a longitudinal rail 58, and superimposed thereupon at its upper edge is a second longitudinal rail 59.

The two sides of the type of the machine being substantially alike, only one need be referred to. The cam-carriage 60 is driven by a slide-bar 61, on which it is attached, and which each rest upon the rail 58 and against the lower side face of the rail 59, the latter being rabbeted, so as to overhang and guide the bar 61. The lower side of the carriage 60 rides upon the rail 57 and against a suitable shoulder 62 formed thereon and is held in this "way" by a rail 63, secured to the upper face of the rail 57, so as to overhang the carriage 60.

The needle-plates 55 are transversely grooved, and within each groove there is seated a needle 64, which is held to its seat by a U-shaped spring 65, reacting between the needle and the rail 58. The rearward end of each needle rests upon a needle-supporter 66, which is a short bar lying within the needle-plate groove and having a finger 66$^a$ projecting through the needle-plate and riding upon the surface of one of the pattern-cylinders 67 68. Each needle is provided with an upstanding finger 69 near its rearward end, adapted to be brought into engagement with the advancing and retracting cams, which are hereinafter described. The upper edge of each needle-plate is recessed intermediate of the needle-grooves to receive the casting-off jacks 70, which are set in similar recesses within the upper edge of the rail 58, being secured therein by means of the rods 73, extending from end to end of the bed of the machine. A wedge-bar 74 is interposed between the rearward ends of the jacks 70 and the upper or front face of the rail 59.

The yarn-carrier 75 (shown only in outline in this case) spans the throat of the machine and has downwardly-projecting feet which slide in suitable grooves in the rails 59 59, so that the carrier is adapted to reciprocate from end to end of the bed of the machine.

Power to drive the machine is transmitted to the shaft 76, journaled transversely across the rearward portion of the frame of the machine and carrying the fast and loose belt-pulleys 77 and 78 and a pinion 79, which intermeshes with a gear-wheel 80, mounted upon a crank-shaft 81, from the crank 82 of which leads a pitman 83 to a lever 84, fulcrumed in a link 85, pivoted to a block 86, secured to the floor-plate 51. The upper end of the lever 84 is secured to a cross-head 87, attached to the rearward ends of the slide-bars 61, which drive the cam-carrier 60. In order to secure a variable stroke of the cam-carriages, the pitman 83 is attached to the lever 84 by means of a block 88, having a pin 89, which extends through and slides in a longitudinal slot in the lever, the block also being in sliding engagement with an arm 90, which swings from a pin 91, set in the rail 52$^a$. The block 88 is supported by means of a link-rod 92, to which it is adjustably secured by means of a set-screw 93, which rod is suspended from one end of a rocker-arm 94, pivoted upon a stud 95, set through the rail 52$^a$, the opposite end of the arm 94 being provided with a laterally-projecting finger 96, which rides upon a snail-cam 97, mounted upon a shaft 98. A weight 99 is suspended from the supported end of the arm 94 by means of a rod 100, the lower end of which is provided with a piston 101, which plays in a dash-pot 102. The cam-carriage is cushioned at each end of its stroke by a double dash-pot 103, the piston-rod 104 of which is secured to an arch 104$^a$, spanning the throat of the machine and secured to the two slide-bars 61 61. The barrel of the dash-pot 103 is provided with air-ports 105 midway between its ends.

Power is transmitted to the fashioning mechanism of the machine by means of a shaft 106, which is driven from the shaft 81 by means of a pair of skew-gears 107 107$^a$, mounted, respectively, upon the shafts named. A pair or take-up rollers 108 109 is journaled below each pair of beds of the machine, these rolls being driven from the shaft 106. For this purpose a pinion 110 is fixed upon the shaft, intermeshing with a pinion 111, carried by a shaft 112, journaled in the partition-plate 54 and having at its opposite end a crank-wheel 113, from the pin of which there leads a pitman 114, which is pivotally connected with a lever 115, fulcrumed upon the hub of a ratchet-wheel 116, fixed upon the end of the shaft 117 of the take-up rollers 108 108. The lever 115 carries a spring-pawl 118, which coacts with the ratchet-wheel 116, and a spring-dog 119 also engages the ratchet-wheel to prevent its backward movement. The crank-wheel 113 is provided with a T-groove 113$^a$ across its face, and the crank-pin of this wheel is adjustably fixed within this groove, so that the stroke of the lever 115 may be varied. The shaft 117 is journaled in blocks 120 120, sliding in suitable brackets 121, formed, respectively, upon the partition-plate 54 and the end plate 53, and a set-screw 122 bears against each of the blocks 120, so as to force the rollers 108 against the rollers 109 for the purpose of transmitting power to the latter.

The pattern-cylinders 67 and 68 are fixed upon shafts 123 and 124, which are journaled longitudinally as to the machine in the plates 53 and 54, and one of these shafts, as 124, is prolonged toward the rearward end of the machine and is provided with a beveled gear 125, intermeshing with a similar gear 126, fixed upon the shaft 98, by which means the stroke-adjusting mechanism already described is controlled. The shafts 123 and 124 project through the plate 53, and upon the outer ends of each there is mounted a ratchet-wheel 127 128.

The pattern-cylinders 67 and 68 are driven from the shaft 106 by the following mechanism: A pinion 129 is mounted upon the end of the shaft at the outside of the end plate 53 and meshes with a gear-wheel 130, which in turn meshes with a gear-wheel 131, with which there is mounted a cam-wheel 132, having enlargements 136 and 137 on its periphery. This cam-wheel actuates spring-controlled rock-levers 133 and 134, each of which carries a spring-pawl 135 and 136$^a$, coacting, respectively, with the ratchet-wheels 128 and 127.

The machine herein shown is especially adapted to make shirt-sleeves, such as the article covered by Letters Patent No. 644,466, granted to George E. Rutledge and Ulysses G. Lee February 27, 1900, fabricating them from the cuff to the shoulder and widening toward the upper end of the sleeve. In order to accomplish the widening, it is important that the pattern-cylinders be moved alternately and each twice in succession for the purpose of throwing in a needle first at one side of the sleeve and then at the other, and this action is accomplished by means of the two enlargements 136 137 on the periphery of the cam-wheel 132, so disposed that each of the rock-levers is actuated by them successively—that is to say, each lever is actuated twice in succession. The machine is also adapted to make the change automatically from the upper end of a completed sleeve to the cuff of the next sleeve, involving the instantaneous narrowing of the fabric and the dropping of alternate needles in order that the cuff may be knitted more openly than the upper portion of the sleeve. In making this change it is essential that the shifting of the needles in both banks be simultaneous and to that end that both pattern-cylinders be actuated from the same rock-lever. This is accomplished by placing upon one of the ratchet-wheels, as 127, a plate 138, which lifts the pawl 136$^a$ out of the ratchet-teeth, thereby leaving the rock-lever 134 free to swing without advancing the ratchet-wheel. A succession of ratchet-teeth 139 for the purposes for which the present machine is adapted, three such teeth being required, are formed in the outer disk-face of the wheel 127. An arm 140 swings loosely upon the outer end of the shaft 123 in contact with the front disk face of the ratchet-wheel 127 and is connected by means of a linkbar 141 with the rock-lever 133. A pin 142 sets loosely through a suitable aperture in the arm 40, so as to impinge against the face of the wheel 127 and engage the ratchet-teeth 139. This pin is forced inwardly by means of a leaf-spring 143. The teeth 139 and the plate 138 are so disposed that as the pawl 136$^a$ is lifted out of the ratchet-teeth by the latter plate the pin 142 comes into engagement with the teeth 139, so that as the rock-lever 133 is oscillated it advances both of the pattern-cylinders simultaneously. The linkbar 141 is shown as being provided with a turnbuckle, by means of which its length may be easily adjusted.

For fabricating the particular work for which this machine is adapted it is of course necessary that the pattern-cylinders shall be at rest during such period as may be occupied in the knitting of those portions of the sleeve which are of uniform width, and this is accomplished by the employment of mechanism for automatically disengaging the cam-wheel 132 from the gear-wheel 131, with which it is mounted. This cam-wheel is loosely mounted upon a stud shaft 144, fixed in the plate 53 and projecting from its outer face and loosely carrying the gear-wheel 131. A pin 145 fits loosely in an aperture through the cam-wheel 132, its inner end being adapted to engage a block 146, secured to the outer disk face of the gear-wheel 131, so that as this wheel is rotated the cam-wheel will be carried around with it, and the pin 145 is normally held in the path of this block by means of a leaf-spring 147, which bears against its outer end. The pin 145 is withdrawn from the path of the block 146 by means of a rock-lever 148, one end of which rides upon the disk face of the cam-wheel 132, its extreme end being sufficiently thin so that it will pass under the laterally-projecting head of the pin 145 and its body portion becoming thickened, so that as the head of the pin rides up upon it the pin is drawn out. The farther end of the rock-arm 148 rides upon the periphery of a pattern-wheel 149, which has elevated and depressed portions, the elevated portions lifting the arm 148, so as to throw its opposite end out of the path of the pin 145, and the depressed portions lowering the contacting end of the arm 148, so that its opposite end is brought into the path of this pin. By giving the periphery of the pattern-wheel the suitable conformation the desired movement of the pattern-cylinders may be secured. The pattern-wheel 149 is driven in the following manner: A beveled gear 150 is fixed upon the inner end of the hub of the gear-wheel 131 and intermeshes with a beveled gear 151, fixed upon a shaft 152, journaled in a suitable box secured to the inner face of the plate 53 and carrying at its lower end a worm 153, which actuates a gear-wheel 154, fixed upon a shaft 155, journaled through the plate 53 and carrying at its outer end a pinion 156, which meshes with the internal gear-teeth formed on the pattern-wheel 149.

In order to adapt the machine for the manufacture of articles of other forms, it is necessary to substitute for the pattern-wheel shown in the drawings one having such conformation of periphery face as may be desired, and to this end the pattern-wheels are made in annular form, with internal gear-teeth for engaging the pinion 156, and are mounted upon a crescent plate 157, corresponding in diameter with the internal diameter of the pattern-wheel and forming a bearing for the apexes of the gear-teeth of the latter. This crescent plate is secured to a bar 160, having a T-slot, by means of a bolt 159, the bar 160 being fixed to the plate 53. The base of the crescent plate 157 is somewhat larger in diameter than the crescent portion and serves as a seat for the ring 149, and a cap-plate 158, of greater diameter than the internal diameter of this ring, is secured to the outer face of the crescent plate by means of the bolt 159. The base of the crescent plate is apertured to receive the hub of the pinion 156. The slotted bar 160 is apertured at its upper end to accommodate the shaft 155 and by means of this shaft is anchored in position, the lower end being secured by means of a screw 161. By means of this construction pattern-wheels of varying sizes may be applied to the machine, a crescent plate adapted to carry each wheel being employed, and the attachment of crescent plates of different sizes is made possible by the use of the slotted bar 160. This construction provides for a wide range of uses for the machine without employing the long and cumbersome pattern-chains which are commonly found upon knitting-machines. The carriage 60 is provided with a cam-plate 162, secured to it by means of a plate 163 and carrying a V-shaped needle-advancing cam 164 and a pair of V-shaped retracting-cams 165 of the usual type, these several cams being adapted to engage the lateral fingers 69 of the needles when the rearward end of the needle is raised by the action of the pattern-cylinder 67 or 68.

As is well known in the art, the fabric knitted upon machines of this type may be made with a loose or tight stitch by varying the position of the retracting-cams, the loose stitch being formed by so placing the cams that they withdraw the needles sufficiently to provide a long loop, while the tight work results from a shorter stroke of the needles, so that the loop is not drawn out to any length. To this end the retracting-cams 165 are secured to the plate 162 by means of headed studs 166, passing through suitable diagonal slots in the cams, and the movement of each cam is controlled by means of a crank-pin 167, entering a suitable transverse slot in the cam and being carried by a short shaft 168, projecting upwardly through the plate 163 and being journaled in a boss 169, rising from the upper surface thereof.

The present machine is so organized that the retracting-cams may be automatically moved for the purpose of varying the stitch in harmony with the variations in the pattern, and to this end the shaft 168 is provided with a segmental worm-gear 170, intermeshing with a worm 171, fixed upon a sleeve 172, sliding upon a shaft 173 and held in non-rotative engagement therewith by means of a key-piece 174, running in a suitable groove in the shaft. The shaft is journaled in suitable brackets at the ends of the bed of the machine and also in a clip 175, secured to the plate 163. The shaft overhangs the end plate 53 and at its end is provided with a pinion 176, which intermeshes with a a rack 177, formed on a rod 178. This rod is pivotally attached to one arm of a bell-crank 179, the other end of which is connected by means of a link-bar 180 with an arm 181, pivotally mounted upon a block 182, secured to the plate 53, to which block also the arm 148, already described, is pivoted. The arm 181 is provided with a toe-piece 184, which lies in the path of a block 183, secured to the inner side face of the pattern-wheel 149, so that by the contact therewith of the block the arm 181 is raised, thus rocking the bell-crank 179, moving the arm 178 longitudinally, turning the shaft 177, and moving the retracting-cams 165. A retracting-spring 185 draws the arm 181 downwardly when disengaged from the block 183, thereby moving the parts in the opposite direction. By properly disposing the block 183 with reference to the pattern-wheel it is obvious that the character of the stitches may be varied as desired. An adjustable stop 186 limits the downward movement of the arm 181, so that the range of movement of the needle-cams may be adjustably fixed. The link-bar 180 is provided with a turnbuckle 187. By lengthening or shortening this link-bar the limit to which the cams may be moved forward is determined.

The yarn-carrier frame 75 is driven from the carriage 60, and its connection therewith is by means of a dog 188, pivoted upon a sleeve 189 between a pair of bracket-arms 190, rising from the yarn-carrier frame secured to the sleeve, the end of the dog falling between a pair of shoulders 191 rising from the upper portion of the carriage 60.

The sleeve 189 is adapted to slide freely upon the shaft 192, but is prevented from rotative movement thereupon by a key 193, which engages a longitudinal groove in the shaft. The details of construction of these parts are the same as in the case of the sleeve 172, shaft 173, and key 174 and are therefore not more fully illustrated.

The shaft 192 is journaled at the ends of the bed of the machine, and at the end which overlaps the plate 53 it is provided with a crank-arm 194, connected by means of a rigid link 195 with a spring-controlled rocker-arm 196, having its free end in the path of a cam-block 197, fixed to the inner face of the ratchet-wheel 128, so that at each revolution of this ratchet-wheel the arm 196 is swung upon its pivot, so as to turn the shaft 192 sufficiently to lift the dog 188 out of engagement with the shoulders 191, thereby permitting the yarn-carrier to remain at rest while the carriage 60 travels in its ordinary manner.

The rearward faces of the shoulders 191 are inclined downwardly, as shown at 198, so that when the dog 188 is released by the disengagement of the block 197 and the arm 196 it will be automatically raised by the cam action of the inclines 198, so as to be again brought into engagement with the carriage 60.

The pattern-cylinders are prevented from retrogression during the backward movement of the pawls 135 136$^a$ by means of the spring-controlled dogs 199 200 in engagement with them.

A hand-wheel 201 is fixed upon the shaft 76 for convenience in moving the mechanism of the machine without the application of the belt to the fixed pulley.

The mechanism herein shown for varying the stroke of the cam-carriage forms the subject of a copending application by us, Serial No. 740,504, and the form of pattern-cylinders shown is made the subject of a copending application of George E. Rutledge and Ulysses G. Lee, Serial No. 234, Series of 1900, and hence these features of the machine are not claimed in this application.

We claim as our invention—

1. In a knitting-machine, in combination, a fashioning-cylinder, ratchet-and-pawl mechanism for turning the cylinder, a power-driven cam for actuating the pawl, a clutch for engaging the cam with its actuating parts, and a cam-wheel for controlling the clutch.

2. In a knitting-machine, in combination, a fashioning-cylinder, ratchet and pawl for turning the cylinder, a cam-wheel for actuating the pawl, a power-driven part for turning the cam-wheel, clutch mechanism for engaging the cam-wheel with such power-driven part, a lever for releasing the clutch, and a constantly-moving cam-wheel for controlling the lever.

3. In a knitting-machine, in combination, a pair of fashioning-cylinders, a pawl and ratchet for driving each cylinder, a cam-wheel for actuating the pawls alternately, a power-driven part for turning the cam-wheel, clutch mechanism for connecting the cam-wheel with such part, a lever for releasing the clutch, and a constantly-moving cam-wheel for controlling the lever.

4. In a knitting-machine, in combination, a fashioning-cylinder, mechanism for turning the cylinder, a cam-wheel for controlling such turning mechanism, a power-driven gear for rotating the cam-wheel, an adjustable bearing for the cam-wheel, whereby the center of rotation of such wheel may be moved with reference to its driving-gear so that the size of the cam-wheel may be varied.

5. In a knitting-machine, in combination, a frame, a supporting-bar secured to the frame and having a T-groove therein, a shaft journaled in the frame and bearing a pinion, a crescent-shaped plate, a T-bolt for adjustably securing the plate to the supporting-bar, an annulus having internal gear and having a bearing on the periphery of the plate and intermeshing with the pinion, such annulus having cam elevations and depressions on its periphery, a fashioning-cylinder, mechanism for rotating the cylinder, and means controlled by the cam-face of the annulus for throwing such cylinder-rotating mechanism out of action.

6. In a knitting-machine, in combination, a carriage having movable needle-retracting cams, means for causing the reciprocation of the carriage, mechanism for shifting the retracting-cams, a fashioning-cylinder, means for rotating such cylinder, and a cam-wheel for controlling the cylinder-rotating mechanism and for actuating the means for shifting the retracting-cams.

7. In a knitting-machine, in combination, a pair of fashioning-cylinders, ratchet-and-pawl mechanism for rotating each cylinder, means for actuating the pawls in alternation, means for interrupting the action of the ratchet-and-pawl mechanism of one cylinder, and means for actuating both cylinders simultaneously during such interruption.

8. In a knitting-machine, in combination, a carriage having a movable needle-actuating cam, means for causing the reciprocation of the carriage, a crank-shaft for controlling the movable cam, a shaft 173, worm-and-gear connection between the said shaft and the crank-shaft, a fashioning-cylinder, means for rotating such cylinder, a cam-wheel for controlling the cylinder-rotating means, and means actuated by such cam-wheel for rotating the shaft 173.

9. In a knitting-machine, in combination, a shaft 173, a reciprocating carriage having a movable needle-actuating cam, means for causing the reciprocation of the carriage, means for turning the shaft 173, and connection between such shaft and the movable cam whereby the cam is shifted by the turning of the shaft.

10. In a knitting-machine, in combination, a rotatable shaft, 173, a reciprocating carriage having a movable needle-actuating cam, a crank-shaft for controlling the cam, worm-and-gear connection between the shaft 173 and the crank-shaft, and means for rotating the shaft 173.

11. In a knitting-machine, in combination, a rotatable shaft, 173, a reciprocating carriage having a movable needle-actuating cam, a crank-shaft for controlling the cam, worm-and-gear connection between the shaft 173 and the crank-shaft, a pinion on the shaft 173, a reciprocating gear-rack meshing with the pinion, and means for causing the reciprocation of the rack.

12. In a knitting-machine, in combination, a rotatable shaft, 173, a reciprocating carriage having a movable needle-actuating cam, a crank-shaft for controlling the cam, worm-and-gear connection between the shaft 173 and the crank-shaft, a pinion on the shaft, 173, a reciprocating gear-rack meshing with the pinion, a bell-crank for actuating the rack, and a cam for rocking the bell-crank.

WILLIAM K. MILLHOLLAND.
ULYSSES G. LEE.

Witnesses:
I. A. HELMICH,
LOUIS K. GILLSON.